US012583970B2

(12) United States Patent
Oh et al.

(10) Patent No.: US 12,583,970 B2
(45) **Date of Patent: \*Mar. 24, 2026**

(54) POLYAMIDE-BASED FILM, PREPARATION METHOD THEREOF, AND COVER WINDOW AND DISPLAY DEVICE COMPRISING THE SAME

(71) Applicant: SK microworks Co., Ltd., Gyeonggi-do (KR)

(72) Inventors: Dae Seong Oh, Gyeonggi-do (KR); Sun Hwan Kim, Gyeonggi-do (KR); Jin Woo Lee, Gyeonggi-do (KR)

(73) Assignee: Microworks Solutions Co., Ltd., Chungcheongnam-do (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 17/852,006

(22) Filed: Jun. 28, 2022

(65) Prior Publication Data

US 2023/0090709 A1 Mar. 23, 2023

(30) Foreign Application Priority Data

Aug. 31, 2021 (KR) ........................ 10-2021-0115982

(51) Int. Cl.
C08G 69/32 (2006.01)
B32B 7/12 (2006.01)
(Continued)

(52) U.S. Cl.
CPC .............. C08G 69/32 (2013.01); B32B 7/12 (2013.01); B32B 27/06 (2013.01); B32B 27/20 (2013.01);
(Continued)

(58) Field of Classification Search
CPC ...... C08G 69/32; C08G 69/265; C08G 69/42; B32B 7/12; B32B 27/06; B32B 27/34;
(Continued)

(56) References Cited

U.S. PATENT DOCUMENTS

2019/0359772 A1\* 11/2019 Kim ........................ B29C 39/42
2020/0407506 A1\* 12/2020 Kim ........................ C08K 3/105
(Continued)

FOREIGN PATENT DOCUMENTS

JP 2020-003781 A 1/2020
KR 10-2019-0043458 A 4/2019
(Continued)

OTHER PUBLICATIONS

Dong, Yao, "The Effects of Processing Techniques on Mechanical Properties of Selected Polymers", pp. 1-124, May 2013.\*
(Continued)

*Primary Examiner* — Tamra L. Dicus
(74) *Attorney, Agent, or Firm* — IP & T GROUP LLP

(57) ABSTRACT

The embodiments provide a polyamide-based film, which comprises a polyamide-based polymer and has an $RSR_A$ value of 3.4 m/N to 5.0 m/N as represented by the following Equation 1 based on the thickness of the film of 50 $\mu$m, and which is excellent in loop stiffness, static flexural characteristics, and folding characteristics while securing mechanical and optical properties at least a certain level, a process for preparing the same, and a cover window and a display device comprising the same. <Equation 1> $RSR_A=(RSR_{MD}+RSR_{TD})/2$ In Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature.

7 Claims, 3 Drawing Sheets

(51) Int. Cl.
    *B32B 27/06*          (2006.01)
    *B32B 27/20*          (2006.01)
    *B32B 27/34*          (2006.01)

(52) U.S. Cl.
    CPC ...... *B32B 27/34* (2013.01); *B32B 2307/4026*
        (2013.01); *B32B 2307/414* (2013.01); *B32B*
        *2307/54* (2013.01); *B32B 2307/732* (2013.01);
        *B32B 2457/20* (2013.01)

(58) Field of Classification Search
    CPC .......... B32B 2307/414; B32B 2307/54; B32B
        2457/20; C08K 5/0041; C08K 5/3475;
        C08J 2377/06; C08J 5/18; C08J 2377/10;
        G02F 1/133723
    See application file for complete search history.

(56)            References Cited

U.S. PATENT DOCUMENTS

| | | | | |
|---|---|---|---|---|
| 2020/0407519 | A1* | 12/2020 | Ki | C08J 5/18 |
| 2020/0407521 | A1* | 12/2020 | Oh | B32B 27/281 |
| 2020/0407522 | A1* | 12/2020 | Choi | G02B 1/00 |
| 2020/0409413 | A1 | 12/2020 | Kim et al. | |
| 2021/0246265 | A1* | 8/2021 | Lee | C08G 73/1042 |
| 2021/0341971 | A1* | 11/2021 | Park | G06F 1/1652 |
| 2022/0315702 | A1* | 10/2022 | Park | C08G 73/1039 |

FOREIGN PATENT DOCUMENTS

| | | | | |
|---|---|---|---|---|
| KR | 102147342 | B1 * | 8/2020 | |
| KR | 10-2021-0001845 | A | 1/2021 | |
| WO | WO-2017200042 | A1 * | 11/2017 | B32B 27/08 |

OTHER PUBLICATIONS

Office Action issued to the corresponding Japanese Patent Application No. 2022-115155, of which mailing date is Jul. 4, 2023.
Extended European Search Report for the European Patent Application No. 22192303.0 issued by the European Patent Office on Jan. 24, 2023.
Office Action for Korean Patent Application No. 10-2021-0115982 issued by the Korean Patent Office on Mar. 15, 2023.

* cited by examiner

A – A'

(a)

(b)

POLYAMIDE-BASED FILM, PREPARATION METHOD THEREOF, AND COVER WINDOW AND DISPLAY DEVICE COMPRISING THE SAME

CROSS-REFERENCE TO RELATED APPLICATION

This application claims benefit of priority to Korean Patent Application No. 10-2021-0115982 filed on Aug. 31, 2021 in the Korean Intellectual Property Office, the disclosure of which is incorporated herein by reference in its entirety.

TECHNICAL FIELD

Embodiments relate to a polyamide-based film, to a process for preparing the same, and to a cover window and a display device comprising the same.

BACKGROUND ART

Polyamide-based resins such as poly(amide-imide) (PAI) are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used together with a fluoropolymer as a painter for decoration and corrosion prevention. It also plays a role of bonding a fluoropolymer to a metal substrate. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

When such a polyamide-based film is applied to a cover window or a foldable or flexible display device, there is a problem in that a folding mark remains in a hinge part as a result of repeated folding operations.

Thus, there has been a continuous demand for the development of a film that has an excellent restoring force and is excellent in mechanical properties and optical properties while the above problem is solved.

DETAILED DESCRIPTION OF THE INVENTION

Technical Problem

An object of the embodiments is to provide a polyamide-based film that is excellent in loop stiffness, static flexural characteristics, and folding characteristics while securing mechanical and optical properties at least a certain level, a process for preparing the same, and a cover window and a display device comprising the same.

Solution to the Problem

An embodiment provides a polyamide-based film, which comprises a polyamide-based polymer and has an $RSR_A$ value of 3.4 m/N to 5.0 m/N as represented by the following Equation 1 based on the thickness of the film of 50 μm.

$$RSR_A=(RSR_{MD}+RSR_{TD})/2 \qquad \text{<Equation 1>}$$

In Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature.

Another embodiment provides a cover window for a display device, which comprises a polyamide-based film and a functional layer, wherein the polyamide-based film comprises a polyamide-based polymer and has an $RSR_A$ value of 3.4 m/N to 5.0 m/N as represented by the following Equation 1 based on the thickness of the film of 50 μm.

Still another embodiment provides a display device, which comprises a display unit; and a cover window disposed on the display unit, wherein the cover window comprises a polyamide-based film and a functional layer, and the polyamide-based film comprises a polyamide-based polymer and has an $RSR_A$ value of 3.4 m/N to 5.0 m/N as represented by the following Equation 1 based on the thickness of the film of 50 μm.

An embodiment provides a process for preparing a polyamide-based film, which comprises polymerizing a diamine compound, a dicarbonyl compound, and, optionally, a dianhydride compound in an organic solvent to prepare a polyamide-based polymer solution; casting the solution and then drying it to prepare a gel sheet; and thermally treating the gel sheet, wherein the step of thermally treating the gel sheet is carried out by fixing both ends of the gel sheet in the transverse direction with a fixing part, and thermally treating it while the width of the fixed gel sheet is changed.

Advantageous Effects of the Invention

As the polyamide-based film according to the embodiments has an $RSR_A$ value in a predetermined range, it exhibits excellent flexibility and mechanical durability, whereby it is possible to minimize folding marks that may remain as a result of repeated folding operations of the film and to improve the restoring force.

When the polyamide-based film is applied to a cover window for a display device or a foldable or flexible display device, a folding operation is possible by an appropriate force, and deformation that may occur in the hinge part during repeated folding is minimized, whereby it is possible to enhance the long-term use stability and quality reliability.

BEST MODE FOR CARRYING OUT THE INVENTION

Figure 1:
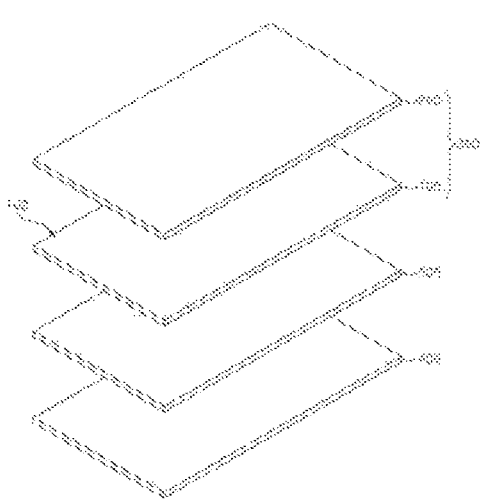
FIG. 1 is a schematic exploded view of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

An embodiment provides a polyamide-based film, which has an $RSR_A$ value in a predetermined range, so that it exhibits excellent flexibility and mechanical durability; thus, it is possible to minimize folding marks around a hinge part that may be caused by repeated folding operations of the film and to improve the restoring force.

The polyamide-based film according to an embodiment comprises a polyamide-base polymer.

The polyamide-based film has an $RSR_A$ value of 3.4 m/N to 5.0 m/N as represented by the following Equation 1 based on the thickness thereof of 50 μm.

$$RSR_A = (RSR_{MD} + RSR_{TD})/2 \qquad \text{<Equation 1>}$$

In Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature.

Specifically, the $RSR_A$ value of the polyamide-based film may be 3.4 m/N or more, 3.5 m/N or more, 3.6 m/N or more, 3.7 m/N or more, or 3.8 m/N or more, and it may be 5.0 m/N or less, 4.8 m/N or less, 4.5 m/N or less, or 4.2 m/N or less, as represented by the above Equation 1 based on the thickness thereof of 50 μm.

Figure 5:
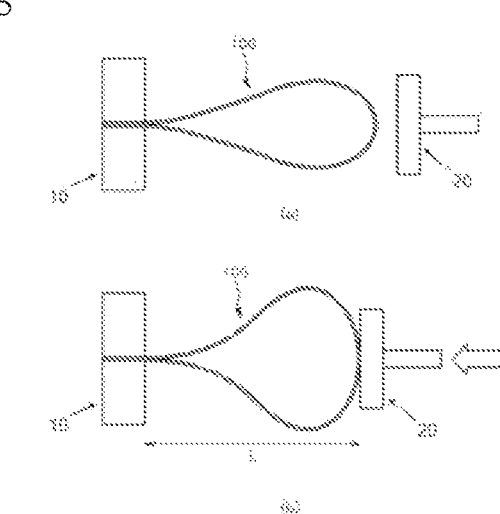
FIG. 5 schematically illustrates a method for measuring the loop stiffness of a polyamide-based film according to an embodiment.

The method of measuring loop stiffness of the polyamide-based film is illustrated in FIG. 5. Specifically, referring to FIG. 5(a), the loop stiffness tester (TOYOSEIKI) comprises a fixing part (10), a pressing part (20), and a sensor (not shown). Both ends of a polyamide-based film (100) having a width of 15 mm, a length of 120 mm, and a thickness of 50 μm are fixed to the fixing part (10). Subsequently, referring to FIG. 5(b), the polyamide-based film (100) is pressed using the pressing part (20) at a pressing speed of 3.3 mm/s until the final separation distance (L) between the pressing part (20) and the fixing part (10) is 20 mm. Then, the loop stiffness of the polyamide-based film (100) is measured with the sensor.

As the $RSR_A$ value of the polyamide-based film is controlled to the above range, it is possible to achieve a polyamide-based film in which, when the film is applied to a flexible display device, the folding marks around a hinge part that may be caused by repeated folding operations of the film are minimized, and the restoring force is improved.

On the other hand, if the $RSR_A$ value of the polyamide-based film exceeds the above range, the flexibility of the film is lowered, requiring too much force to fold it, which causes inconveniences during folding or bending thereof. If the $RSR_A$ value of the polyamide-based film is less than the above range, wrinkles may be vividly visible after repeated folding, thereby deteriorating the quality reliability of a product.

When the loop stiffness is measured at room temperature in which a specimen with the MD direction of the polyamide-based film as the longitudinal direction has been prepared, and the loop stiffness value thereof measured is $RSR_{MD}$, the $RSR_{MD}$ value is 3.35 m/N to 5.0 m/N.

Specifically, the $RSR_{MD}$ value of the polyamide-based film may be 3.35 m/N or more, 3.4 m/N or more, 3.5 m/N or more, or 3.6 m/N or more, and it may be 5.0 m/N or less, 4.8 m/N or less, 4.5 m/N or less, 4.2 m/N or less, or 4.0 m/N or less.

When the loop stiffness is measured at room temperature in which a specimen with the TD direction of the polyamide-based film as the longitudinal direction has been prepared, and the loop stiffness value thereof measured is $RSR_{TD}$, the $RSR_{TD}$ value is 3.3 m/N to 5.0 m/N.

Specifically, the $RSR_{TD}$ value of the polyamide-based film may be 3.3 m/N or more, 3.4 m/N or more, 3.5 m/N or more, or 3.6 m/N or more, and it may be 5.0 m/N or less, 4.8 m/N or less, 4.5 m/N or less, 4.2 m/N or less, or 4.1 m/N or less.

If the $RSR_{MD}$ value and the $RSR_{TD}$ value of the polyamide-based film satisfy the above ranges, it has the desired level of loop stiffness values both in the MD and TD directions, i.e., regardless of the direction of the film; thus, the quality deviation between the MD/TD directions is low, whereby it is possible to secure quality reliability and to enhance product yield.

On the other hand, if any of the $RSR_{MD}$ value and the $RSR_{TD}$ value of the polyamide-based film falls outside the above ranges, the quality deviation of the film in the directions of the film is increased, which deteriorates the quality of the film itself and directly lead to a product with a high defect rate when applied to a final product.

In addition, if both the $RSR_{MD}$ value and the $RSR_{TD}$ value of the polyamide-based film fall outside the above ranges, the flexibility or mechanical durability of the film may be significantly deteriorated.

The polyamide-based film has an $RSL_A$ value of 3.4 m/N to 5.0 m/N as represented by the following Equation 2 based on the thickness thereof of 50 μm.

$$RSL_A = (RSL_{MD} + RSL_{TD})/2 \qquad \text{<Equation 2>}$$

In Equation 2, $RSL_{MD}$ is the loop stiffness value measured with the MD direction of the film as the longitudinal direction within 1 minute after the film is left at −20° C. for 2 hours, and $RSL_{TD}$ is the loop stiffness value measured with the TD direction of the film as the longitudinal direction within 1 minute after the film is left at −20° C. for 2 hours.

Specifically, the $RSL_A$ value of the polyamide-based film may be 3.4 m/N or more, 3.5 m/N or more, 3.6 m/N or more, 3.7 m/N or more, or 3.8 m/N or more, and it may be 5.0 m/N or less, 4.8 m/N or less, 4.5 m/N or less, or 4.2 m/N or less, as represented by the above Equation 2 based on the thickness thereof of 50 μm.

As the $RSL_A$ value of the polyamide-based film is controlled to the above range, it is possible to achieve the desired level of loop stiffness even after it is left for 2 hours at an extremely low temperature of −20° C. Specifically, when the film is applied to a flexible display device, it is possible to lower the defect rate of the product. In particular, even when the flexible display device is used in a harsh environment, mechanical properties or appearance quality are not deteriorated.

When the loop stiffness is measured within 1 minute after the polyamide-based film is left at −20° C. for 2 hours in which a specimen with the MD direction of the film as the longitudinal direction has been prepared, and the loop stiffness value thereof measured is $RSL_{MD}$, the $RSL_{MD}$ value is 3.4 m/N to 5.0 m/N.

Specifically, the $RSL_{MD}$ value of the polyamide-based film may be 3.4 m/N or more, 3.5 m/N or more, 3.6 m/N or more, or 3.8 m/N or more, and it may be 5.0 m/N or less, 4.8 m/N or less, 4.5 m/N or less, or 4.2 m/N or less.

When the loop stiffness is measured within 1 minute after the polyamide-based film is left at −20° C. for 2 hours in which a specimen with the TD direction of the film as the longitudinal direction has been prepared, and the loop stiffness value thereof measured is $RSL_{TD}$, the $RSL_{TD}$ value is 3.4 m/N to 5.0 m/N.

Specifically, the $RSL_{TD}$ value of the polyamide-based film may be 3.4 m/N or more, 3.5 m/N or more, 3.6 m/N or more, or 3.8 m/N or more, and it may be 5.0 m/N or less, 4.8 m/N or less, 4.5 m/N or less, or 4.2 m/N or less.

If the $RSL_{MD}$ value and the $RSL_{TD}$ value of the polyamide-based film satisfy the above ranges, it has the desired level of loop stiffness values both in the MD and TD directions, i.e., regardless of the direction of the film even after it is exposed to extremely low temperatures; thus, the quality deviation is low when the film is applied to a flexible display, whereby it is possible to enhance the product reliability.

In an embodiment, when the polyamide-based film based on a thickness of 50 μm is folded to have a radius of curvature of 2 mm, which is then left at 25° C. for 24 hours, and the force applied to the film is released, the inner angle of the film is 140° or more.

Specifically, when the polyamide-based film based on a thickness of 50 μm is folded to have a radius of curvature of 2 mm, which is then left at 25° C. for 24 hours, and the force applied to the film is released, the inner angle of the film may be 145° or more, 150° or more, 155° or more, or 160° or more, but it is not limited thereto.

Figure 6:
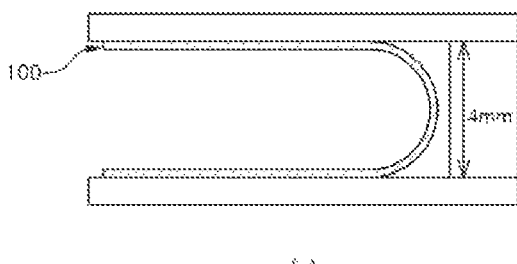
FIG. 6 schematically illustrates a method for measuring the deformation angle of a polyamide-based film according to an embodiment.
Figure 6:
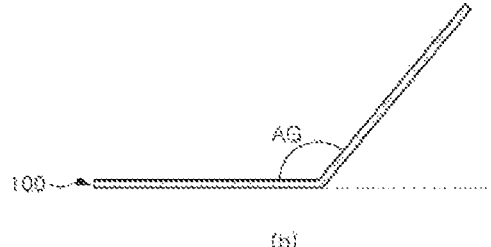

In relation to the static bending characteristics of the polyamide-based film, a method of measuring the deformation angle is shown in FIG. 6. Specifically, referring to FIG. 6(*a*), a polyamide-based film (100) having a width of 20 mm, a length of 150 mm, and a thickness of 50 μm is placed in a glass jig such that the radius of curvature is 2 mm, and it is left in such a folded state at 25° C. for 24 hours. Referring to FIG. 6(*b*), the film is taken out from the glass jig after 24 hours have elapsed. When the force applied to the film is then released, the inner angle (AG) of the film is measured.

If the inner angle of the polyamide-based film measured by the deformation angle evaluation of the film is within the above range, an excellent restoring force is secured; thus, when it is applied to a foldable display device or a flexible display device, image distortion does not take place. In particular, for example, when it is applied to a foldable display device, it is often held in a folded state for a long period of time and then unfolded. In such an event, it is possible to minimize permanent deformation that may take place in the appearance of the device.

According to an embodiment, the polyamide-based film has a modulus of 5.0 GPa or more. Specifically, the modulus may be 5.5 GPa or more, 5.7 GPa or more, or 6 GPa or more.

The polyamide-based film may have a transmittance of 80% or more. For example, the transmittance may be 85% or more, 88% or more, and it may be 100% or less or 99% or less.

The polyamide-based film has a haze of 1% or less. Specifically, the haze may be 0.8% or less, 0.7% or less, 0.6% or less, or 0.5% or less, but it is not limited thereto.

The polyamide-based film has a yellow index of 5 or less. For example, the yellow index may be 4.5 or less, 4.0 or less, or 3.5 or less, but it is not limited thereto.

In an embodiment, the polyamide-based film has a thickness deviation of 3 μm or less or 2 μm or less based on a thickness of 50 μm. In addition, the thickness deviation rate may be 5% or less, 4% or less, or 3% or less, but it is not limited thereto.

The polyamide-based film may have a compressive strength of 0.4 kgf/μm or more. Specifically, the compressive strength may be 0.45 kgf/μm or more, or 0.5 kgf/μm or more, but it is not limited thereto.

When the polyamide-based film is perforated at a speed of 10 mm/minute using a 2.5-mm spherical tip in a UTM compression mode, the maximum diameter (mm) of perforation including a crack is 60 mm or less. Specifically, the maximum diameter (mm) of perforation may be 55 mm or less or 50 mm or less, and may be 1 mm or more, 3 mm or more, 5 mm or more, 10 mm or more, 15 mm or more, or 20 mm or more.

The polyamide-based film may have a surface hardness of HB or higher. Specifically, the surface hardness may be H or higher, or 2H or higher, but it is not limited thereto.

The polyamide-based film may have a tensile strength of 15 kgf/mm$^2$ or more. Specifically, the tensile strength may be 18 kgf/mm$^2$ or more, 20 kgf/mm$^2$ or more, 21 kgf/mm$^2$ or more, or 22 kgf/mm$^2$ or more, but it is not limited thereto.

The polyamide-based film may have an elongation of 15% or more. Specifically, the elongation may be 16% or more, 17% or more, or 18% or more, but it is not limited thereto.

When the polyamide-based film based on a thickness of 50 μm is folded to have a radius of curvature of 3 mm, the number of folding before the fracture may be 200,000 or more. The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film may have a surface roughness of 0.01 μm to 0.07 μm. Specifically, the surface roughness may be 0.01 or more or 0.02 or more, and may be 0.07 μm or less, 0.06 μm or less, or 0.05 μm or less, but it is not limited thereto.

As the surface roughness of the polyamide-based film satisfies the above range, it may be advantageous for achieving luminance conditions or a sense of texture preferable for the application thereof to a display device.

The content of residual solvents in the polyamide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-based film exceeds the above range, the durability of the film may be deteriorated, and it may have an impact on the quality deviation of the film. In particular, since it affects the mechanical strength, it may adversely affect the post-processing of the film. Since the hygroscopicity of the film is accelerated, optical properties and thermal resistance, let alone the mechanical properties, may be deteriorated as well.

The polyamide-based film according to an embodiment comprises a polyamide-based polymer, which is prepared by polymerizing a diamine compound, a dicarbonyl compound, and, optionally, a dianhydride compound.

For example, the polyamide-based polymer may be prepared by polymerizing a diamine compound and a dicarbonyl compound. It may be prepared by polymerizing a diamine compound, a dicarbonyl compound, and a dianhydride compound.

The polyamide-based polymer is a polymer that comprises an amide repeat unit. In addition, the polyamide-based polymer may optionally further comprise an imide repeat unit.

Specifically, the polyamide-based polymer comprises an amide repeat unit derived from the polymerization of a diamine compound and a dicarbonyl compound; and it, optionally, comprises an imide repeat unit derived from the polymerization of a diamine compound and a dianhydride compound.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$$H_2N\text{-}(E)_e\text{-}NH_2 \qquad \text{[Formula 1]}$$

In Formula 1, E may be selected from a substituted or unsubstituted divalent C$_6$-C$_{30}$ aliphatic cyclic group, a substituted or unsubstituted divalent C$_4$-C$_{30}$ heteroaliphatic cyclic group, a substituted or unsubstituted divalent C$_6$-C$_{30}$ aromatic cyclic group, a substituted or unsubstituted divalent C$_4$-C$_{30}$ heteroaromatic cyclic group, a substituted or unsubstituted C$_1$-C$_{30}$ alkylene group, a substituted or unsubstituted C$_2$-C$_{30}$ alkenylene group, a substituted or unsubstituted C$_2$-C$_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

e is selected from integers of 1 to 5. When e is 2 or more, the Es may be the same as, or different from, each other.

(E)$_e$ in Formula 1 may be selected from the groups represented by the following Formulae 1-1a to 1-14a but it is not limited thereto.

1-1a 1-2a 1-3a 1-4a 1-5a 1-6a 1-7a

-continued 1-8a 1-9a 1-10a 1-11a 1-12a 1-13a 1-14a

*——(CH₂)ₙ——*

(n is selected from integers of 1 to 12)

Specifically, (E)ₑ in Formula 1 may be selected from the groups represented by the following Formulae 1-1b to 1-13b, but it is not limited thereto.

1-1b 1-2b 1-3b 1-4b

-continued 1-5b 1-6b 1-7b 1-8b 1-9b 1-10b 1-11b 1-12b 1-13b

More specifically, (E)ₑ in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In some embodiments, the diamine compound may comprise one kind of diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

TFDB

The dianhydride compound has a low birefringence value, so that it can contribute to enhancements in the optical properties such as transmittance of a film that comprises the polyamide-based polymer.

The dianhydride compound is not particularly limited, but it may be, for example, an aromatic dianhydride compound that contains an aromatic structure. For example, the aromatic dianhydride compound may be a compound represented by the following Formula 2.

[Formula 2]

In Formula 2, G may be a group selected from a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, may be fused to each other to form a condensed ring, or may be bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

G in the above Formula 2 may be selected from the groups represented by the following Formulae 2-1a to 2-9a, but it is not limited thereto.

2-1a 2-2a

-continued 2-3a 2-4a 2-5a 2-6a 2-7a 2-8a 2-9a

For example, G in Formula 2 may be the group represented by the above Formula 2-2a, the group represented by the above Formula 2-8a, or the group represented by the above Formula 2-9a.

In an embodiment, the dianhydride compound may comprise a compound having a fluorine-containing substituent, a compound having a biphenyl group, or a compound having a ketone group.

The fluorine-containing substituent may be a fluorinated hydrocarbon group and specifically may be a trifluoromethyl group. But it is not limited thereto.

In another embodiment, the dianhydride compound may be composed of a single component or a mixture of two components.

For example, the dianhydride compound may comprise at least one selected from the group consisting of 2,2'-bis-(3, 4-dicarboxyphenyl)hexafluoropropane dianhydride (6FDA) and 3,3',4,4'-biphenyltetracarboxylic dianhydride (BPDA), which have the following structures, but it is not limited thereto.

6-FDA

BPDA

The diamine compound and the dianhydride compound may be polymerized to form a polyamic acid.

Subsequently, the polyamic acid may be converted to a polyimide through a dehydration reaction, and the polyimide comprises an imide repeat unit.

The polyimide may form a repeat unit represented by the following Formula A.

[Formula A]

In Formula A, E, G, and e are as described above.

For example, the polyimide may comprise a repeat unit represented by the following Formula A-1, but it is not limited thereto.

[Formula A-1]

In Formula A-1, n is an integer of 1 to 400.

The dicarbonyl compound is not particularly limited, but it may be, for example, a compound represented by the following Formula 3.

[Formula 3]

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be Cl, but it is not limited thereto.

$(J)_j$ in the above Formula 3 may be selected from the groups represented by the following Formulae 3-1a to 3-14a, but it is not limited thereto.

1-1a 1-2a 1-3a 1-4a 1-5a 1-6a 1-7a 1-8a 1-9a

15
-continued 1-10a 1-11a 1-12a 1-13a 1-14a

*——(CH₂)ₙ——*

(n is selected from integers of 1 to 12)

Specifically, $(J)_j$ in the above Formula 3 may be selected from the groups represented by the following Formulae 3-1b to 3-8b, but it is not limited thereto.

3-1b 3-2b 3-3b 3-4b 3-5b 3-6b 3-7b 3-8b

16

More specifically, $(J)_j$ in Formula 3 may be the group represented by the above Formula 3-1b, the group represented by the above Formula 3-2b, the group represented by the above Formula 3-3b, or the group represented by the above Formula 3-8b.

For example, $(J)_j$ in the above Formula 3 may be the group represented by the above Formula 3-1b or the group represented by the above Formula 3-2b.

In an embodiment, one kind of a dicarbonyl compound may be used alone, or a mixture of at least two kinds of dicarbonyl compounds different from each other may be used, as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

TPC

BPDC

IPC

The diamine compound and the dicarbonyl compound may be polymerized to form a repeat unit represented by the following Formula B.

[Formula B]

In Formula B, E, J, e, and j are as described above.

For example, the diamine compound and the dicarbonyl compound may be polymerized to form amide repeat units represented by the following Formulae B-1 and B-2.

Alternatively, the diamine compound and the dicarbonyl compound may be polymerized to form amide repeat units represented by the following Formulae B-2 and B-3.

[Formula B-1]

In Formula B-2, y is an integer of 1 to 400.

[Formula B-2]

In Formula B-2, y is an integer of 1 to 400.

[Formula B-3]

In Formula B-3, y is an integer of 1 to 400.

According to an embodiment, the polyamide-based polymer may comprise a repeat unit represented by the following Formula B; and it may optionally comprise a repeat unit represented by the following Formula A:

[Formula A]

[Formula B]

In Formulae A and B, E and J are each independently selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—, e and j are each independently selected from integers of 1 to 5, when e is 2 or more, then the two or more Es are the same as, or different from, each other, when j is 2 or more, then the two or more Js are the same as, or different from, each other, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group is present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

The polyamide-based polymer may comprise an imide-based repeat unit and an amide-based repeat unit at a molar ratio of 0:100 to 70:30. Specifically, the molar ratio of the imide-based repeat unit to the amide-based repeat unit may be 0:100 to 70:30, 0:100 to 60:40, 0:100 to 50:50, or 0:100 to 45:55, but it is not limited thereto.

If the molar ratio of the imide repeat unit to the amide repeat unit of the polyamide-based polymer is within the above range, it is possible to effectively control the $RSR_A$ and $RSL_A$ values of the polyamide-based film and to enhance the flexibility and mechanical durability of the film in combination with the characteristic processing method.

In the polyamide-based polymer, the molar ratio of the repeat unit represented by the above Formula A to the repeat unit represented by the above Formula B may be 0:100 to 70:30. Specifically, the molar ratio of the repeat unit represented by the above Formula A to the repeat unit represented by the above Formula B may be 0:100 to 70:30, 0:100 to 60:40, 0:100 to 50:50, or 0:100 to 45:55, but it is not limited thereto.

The polyamide-based film according to an embodiment may further comprise at least one selected from the group consisting of a filler, a blue pigment, and a UVA absorbent in addition to the polyamide-base polymer.

The filler may comprise, for example, an oxide, a carbonate, or a sulfate of metal or metalloid. For example, the filler may comprise silica, calcium carbonate, barium sulfate, or the like, but it is not limited thereto.

The filler may be employed in the form of particles. In addition, the surface of the filler is not subjected to special coating treatment, and it may be uniformly dispersed in the entire film.

As the polyamide-based film comprises the filler, it is possible to secure a wide angle of view without a deterioration in the optical properties of the film and to enhance not only the roughness and winderability but also the effect of improving the scratches caused by sliding in the preparation of the film.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to nx, ny, and nz can be appropriately adjusted, and the luminance of the film at various angles can be improved.

On the other hand, if the refractive index of the filler is outside the above range, there may arise a problem in that the filler is visually noticeable on the film or that the haze is increased due to the filler.

The content of the filler may be 100 ppm to 15,000 ppm based on the total weight of the solids content of the polyamide-based polymer. Specifically, the content of the filler may be 100 ppm to 14,500 ppm, 100 ppm to 14,200 ppm, 200 ppm to 14,500 ppm, 200 ppm to 14,200 ppm, 250 ppm to 14,100 ppm, or 300 ppm to 14,000 ppm, based on the total weight of the solids content of the polyamide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process.

The blue pigment may comprise OP-1300A manufactured by Toyo, but it is not limited thereto.

In some embodiments, the blue pigment may be employed in an amount of 50 to 5,000 ppm based on the total weight of the polyamide-based polymer. Preferably, the blue pigment may be employed in an amount of 100 to 5,000 ppm, 200 to 5,000 ppm, 300 to 5,000 ppm, 400 to 5,000 ppm, 50 to 3,000 ppm, 100 to 3,000 ppm, 200 to 3,000 ppm, 300 to 3,000 ppm, 400 to 3,000 ppm, 50 to 2,000 ppm, 100 to 2,000 ppm, 200 to 2,000 ppm, 300 to 2,000 ppm, 400 to 2,000 ppm, 50 to 1,000 ppm, 100 to 1,000 ppm, 200 to 1,000 ppm, 300 to 1,000 ppm, or 400 to 1,000 ppm, based on the total weight of the polyamide-based polymer, but it is not limited thereto.

The UVA absorber may comprise an absorber that absorbs electromagnetic waves of a wavelength of 10 to 400 nm used in the art. For example, the UVA absorber may comprise a benzotriazole-based compound. The benzotriazole-based compound may comprise an N-phenolic benzotriazole-based compound. In some embodiments, the N-phenolic benzotriazole-based compound may comprise N-phenolic benzotriazole in which the phenol group is substituted with an alkyl group having 1 to 10 carbon atoms. It may be substituted with two or more of the alkyl group, which may be linear, branched, or cyclic.

In some embodiments, the UVA absorber may be employed in an amount of 0.1 to 10% by weight based on the total weight of the polyamide-based polymer. Preferably, the UVA absorber may be employed in an amount of 0.1 to 5% by weight, 0.1 to 3% by weight, 0.1 to 2% by weight, 0.5 to 10% by weight, 0.5 to 5% by weight, 0.5 to 3% by weight, 0.5 to 2% by weight, 1 to 10% by weight, 1 to 5% by weight, 1 to 3% by weight, or 1 to 2% by weight, relative to the total weight of the polyamide-based polymer, but it is not limited thereto.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

In addition, the $RSR_A$ value, $RSR_{MD}$ value, $RSR_{TD}$ value, $RSL_A$ value, $RSL_{MD}$ value, $RSL_{TD}$ value, inner angle of the film according to the deformation angle evaluation, modulus, transmittance, haze, and yellow index of the polyamide-based film as described above may be adjusted by combinations of the chemical and physical properties of the components, which constitute the polyamide-based film, along with the specific conditions in each step of the process for preparing the polyamide-based film as described below.

For example, the compositions and contents of the components that constitute the polyamide-based film, the polymerization conditions and thermal treatment conditions in the film preparation process, and the like are all combined to achieve the $RSR_A$ value, $RSR_{MD}$ value, $RSR_{TD}$ value, $RSL_A$ value, $RSL_{MD}$ value, $RSL_{TD}$ value, and inner angle of the film according to the deformation angle evaluation in desired ranges.

Cover Window for a Display Device

The cover window for a display device according to an embodiment comprises a polyamide-based film and a functional layer.

The polyamide-based film comprises a polyamide-based film and has an $RSR_A$ value of 3.4 m/N to 5.0 m/N as represented by the above Equation 1 based on the thickness thereof of 50 μm.

Details on the polyamide-based film are as described above.

The cover window for a display device can be advantageously applied to a display device.

Display Device

The display device according to an embodiment comprises a display unit; and a cover window disposed on the display unit, wherein the cover window comprises a polyamide-based film and a functional layer.

The polyamide-based film comprises a polyamide-based film and has an $RSR_A$ value of 3.4 m/N to 5.0 m/N as represented by the above Equation 1 based on the thickness thereof of 50 μm.

Details on the polyamide-based film and the cover window are as described above.

Figure 2:
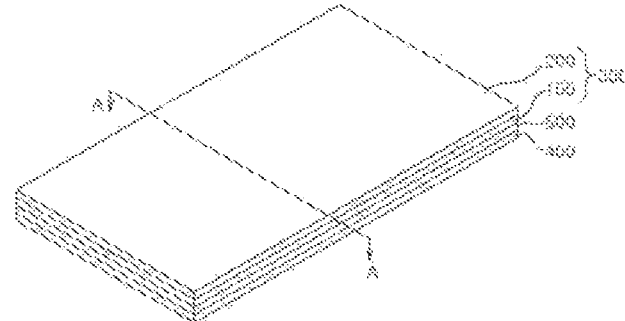
FIG. 2 is a schematic perspective view of a display device according to an embodiment.
Figure 3:
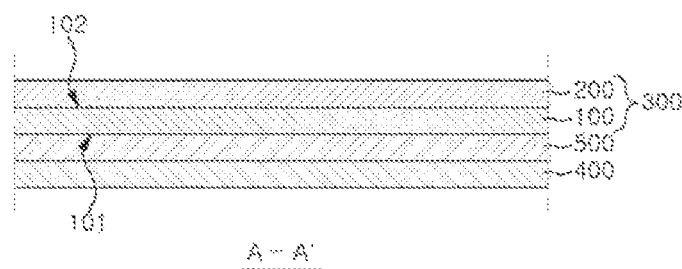
FIG. 3 is a schematic cross-sectional view of a display device according to an embodiment.

FIG. 1 is a schematic exploded view of a display device according to an embodiment. FIG. 2 is a schematic perspective view of a display device according to an embodiment. FIG. 3 is a schematic cross-sectional view of a display device according to an embodiment.

Specifically, FIGS. 1 to 3 illustrate a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outer position of the display device according to an embodiment to thereby protect the display unit.

The cover window (300) may comprise a polyamide-based film and a functional layer. The functional layer may be at least one selected from the group consisting of a hard coating, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-based film according to an embodiment may be excellent in optical properties in terms of high transmittance, low haze, and low yellow index, as well as may have excellent mechanical properties such as modulus and flexibility, and the change (deterioration) of its optical and mechanical properties can be suppressed when it is exposed to UV rays Specifically, in the polyamide-based film having an $RSR_A$ value in the above range, it is possible to achieve excellent flexibility and mechanical durability, to minimize the deformation around the hinge part that may remain as a result of repeated folding operations of the film, and to improve the restoring force. In addition, as it has similar loop stiffness values in the directions, and as it has a desired loop stiffness value at extremely low temperatures, its quality is uniform, its quality reliability is enhanced when it is applied to a final product, and its mechanical properties or appearance quality are not deteriorated even when it is used in harsh environments.

Process for Preparing a Polyamide-Based Film

An embodiment provides a process for preparing a polyamide-based film.

Figure 4:
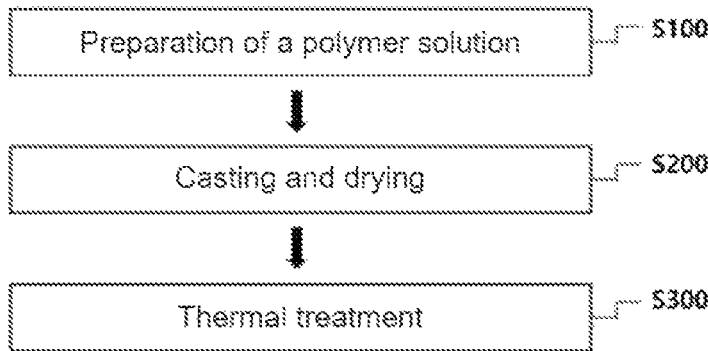
FIG. 4 is a schematic flow diagram of a process for preparing a polyamide-based film according to an embodiment.

The process for preparing a polyamide-based film according to an embodiment comprises polymerizing a diamine compound, a dicarbonyl compound, and, optionally, a dianhydride compound in an organic solvent to prepare a polyamide-based polymer solution (S100); casting the solution and then drying it to prepare a gel sheet (S200); and thermally treating the gel sheet (S300) (see FIG. 4).

The process for preparing a polyamide-based film according to some embodiments may further comprise adjusting the viscosity of the polyamide-based polymer solution (S110), aging the polyamide-based polymer solution (S120), and/or degassing the polyamide-based polymer solution (S130).

The polyamide-based film is a film in which a polyamide-based polymer is a main component. The polyamide-based polymer is a resin that comprises an imide repeat unit and an amide repeat unit at a predetermined molar ratio as a structural unit.

In the process for preparing a polyamide-based film, the polymer solution for preparing a polyamide-based polymer may be prepared by simultaneously or sequentially mixing a diamine compound, a dicarbonyl compound, and, optionally, a dianhydride compound in an organic solvent in a reactor, and reacting the mixture (S100).

In an embodiment, the polymer solution may be prepared by simultaneously mixing and reacting a diamine compound and a dicarbonyl compound in an organic solvent.

Specifically, the step of preparing the polymer solution may comprise mixing and reacting a diamine compound and a dicarbonyl compound in a solvent to produce a polyamide solution.

In another embodiment, the polymer solution may be prepared by simultaneously mixing and reacting a diamine compound, a dianhydride compound, and a dicarbonyl compound in an organic solvent.

Specifically, the step of preparing the polymer solution may comprise first mixing and reacting the diamine compound and the dianhydride compound in a solvent to produce a polyamic acid (PAA) solution; and second mixing and reacting the polyamic acid (PAA) solution and the dicarbonyl compound to form an amide bond and an imide bond. The polyamic acid solution is a solution that comprises a polyamic acid.

Alternatively, the step of preparing the polymer solution may comprise first mixing and reacting the diamine compound and the dianhydride compound in a solvent to produce a polyamic acid solution; subjecting the polyamic acid solution to dehydration to produce a polyimide (PI) solution; and second mixing and reacting the polyimide (PI) solution and the dicarbonyl compound to further form an amide bond. The polyimide solution is a solution that comprises a polymer having an imide repeat unit.

In an embodiment, the step of preparing the polymer solution may comprise first mixing and reacting the diamine compound and the dicarbonyl compound in a solvent to produce a polyamide (PA) solution; and second mixing and reacting the polyamide (PA) solution and the dianhydride compound to further form an imide bond. The polyamide solution is a solution that comprises a polymer having an amide repeat unit.

The polymer solution thus prepared may be a solution that comprises a polymer containing at least one selected from the group consisting of a polyamic acid (PAA) repeat unit, a polyamide (PA) repeat unit, and a polyimide (PI) repeat unit.

Alternatively, the polymer contained in the polymer solution comprises an amide repeat unit derived from the polymerization of the diamine compound and the dicarbonyl compound, and it may optionally comprise an imide repeat unit derived from the polymerization of the diamine compound and the dianhydride compound.

Details on the diamine compound, the dianhydride compound, and the dicarbonyl compound are as described above.

The content of solids contained in the polymer solution may be 10% by weight to 30% by weight. Alternatively, the content of solids contained in the polymer solution may be 15% by weight to 25% by weight or 15% by weight to 20% by weight, but it is not limited thereto.

If the content of solids contained in the polymer solution is within the above range, a polyamide-based film can be effectively produced in the extrusion and casting steps.

In another embodiment, the step of preparing the polymer solution may further comprise introducing a catalyst.

Here, the catalyst may comprise at least one selected from the group consisting of beta picoline, acetic anhydride, isoquinoline (IQ), and pyridine-based compounds, but it is not limited thereto.

The catalyst may be added in an amount of 0.01 to 0.5 molar equivalent, 0.01 to 0.4 molar equivalent, 0.01 to 0.3 molar equivalent, 0.01 to 0.2 molar equivalent, or 0.01 to 0.1 molar equivalent, based on 1 mole of the polyamide-based polymer, but it is not limited thereto.

The further addition of the catalyst may expedite the reaction rate and enhance the chemical bonding force between the repeat unit structures or that within the repeat unit structures.

In an embodiment, the step of preparing the polymer solution may further comprise adjusting the viscosity of the polymer solution (S110). The viscosity of the polymer solution may be 80,000 cps to 500,000 cps, 100,000 cps to 500,000 cps, 150,000 cps to 500,000 cps, 150,000 cps to 450,000 cps, 200,000 cps to 450,000 cps, 200,000 cps to 400,000 cps, 200,000 cps to 350,000 cps, or 200,000 cps to 300,000 cps at room temperature. In such an event, the film-forming capability of a polyamide-based film can be enhanced, thereby enhancing the thickness uniformity.

Specifically, the step of preparing the polymer solution may comprise simultaneously or sequentially mixing and reacting a diamine compound, a dicarbonyl compound, and, optionally, a dianhydride compound in an organic solvent to prepare a first polymer solution; and further adding the dicarbonyl compound to prepare a second polymer solution having the target viscosity.

In the steps of preparing the first polymer solution and the second polymer solution, the polymer solutions have viscosities different from each other. For example, the second polymer solution has a viscosity higher than that of the first polymer solution.

In the steps of preparing the first polymer solution and the second polymer solution, the stirring speeds may be different from each other. For example, the stirring speed when the first polymer solution is prepared may be faster than the stirring speed when the second polymer solution is prepared.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

In an embodiment, the organic solvent may be at least one selected from the group consisting of dimethylformamide (DMF), dimethylacetamide (DMAc), N-methyl-2-pyrrolidone (NMP), m-cresol, tetrahydrofuran (THF), and chloroform. The organic solvent employed in the polymer solution may be dimethylacetamide (DMAc), but it is not limited thereto.

In another embodiment, at least one selected from the group consisting of a filler, a blue pigment, and a UVA absorbent may be added to the polymer solution.

Details on the types and contents of the filler, blue pigment, and UVA absorber are as described above. The filler, blue pigment, and UVA absorber may be mixed with the polyamide-based polymer in the polymer solution.

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In some embodiments, the polymer solution or the polymer solution whose viscosity has been adjusted may be aged (S120).

The aging may be carried out by leaving the polymer solution at a temperature of −10 to −10° C. for 24 hours or longer. In such an event, the polyamide-based polymer or unreacted materials contained in the polymer solution, for example, may complete the reaction or achieve chemical equilibrium, whereby the polymer solution may be homogenized. The mechanical properties and optical properties of a polyamide-based film formed therefrom may be substantially uniform over the entire area of the film. Preferably, the aging may be carried out at a temperature of −5 to 10° C., −5 to 5° C., or −3 to 5° C., but it is not limited thereto.

In an embodiment, the process may further comprise degassing the polyamide-based polymer solution (S130). The step of degassing may remove moisture in the polymer solution and reduce impurities, thereby increasing the reaction yield and imparting excellent surface appearance and mechanical properties to the film finally produced.

The degassing may comprise vacuum degassing or purging with an inert gas.

The vacuum degassing may be carried out for 30 minutes to 3 hours after depressurizing the internal pressure of the tank in which the polymer solution is contained to 0.1 bar to 0.7 bar. The vacuum degassing under these conditions may reduce bubbles in the polymer solution. As a result, it is possible to prevent surface defects of the film produced therefrom and to achieve excellent optical properties such as haze.

In addition, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-based film thus produced.

The polymer solution may be cast to prepare a gel sheet (S200).

For example, the polymer solution may be extruded, coated, and/or dried on a support to form a gel sheet.

In addition, the casting thickness of the polymer solution may be 200 μm to 700 μm. As the polymer solution is cast to a thickness within the above range, the final film produced after the drying and thermal treatment may have an appropriate and uniform thickness.

The polymer solution may have a viscosity of 150,000 cps to 500,000 cps at room temperature as described above. As the viscosity satisfies the above range, the polymer solution can be cast to a uniform thickness without defects, and a polyamide-based film having a substantially uniform thickness can be formed without local/partial thickness variations during drying.

The polymer solution is cast and then dried at a temperature of 60° C. to 150° C., 70° C. to 150° C., 80° C. to 150° C., 90° C. to 150° C., or 90° C. to 120° C., for 5 minutes to 60 minutes or 10 minutes to 40 minutes to prepare a gel sheet. Specifically, the polymer solution is dried at a temperature of 90° C. to 120° C. for 20 minutes to 40 minutes to prepare a gel sheet.

The solvent of the polymer solution may be partially or totally volatilized during the drying to prepare the gel sheet.

The dried gel sheet may be thermally treated to form a polyamide-based film (S300).

The thermal treatment of the gel sheet may be carried out, for example, through a thermal treatment device (or tenter). The thermal treatment device may comprise at least one hot air blower and at least one heater. The thermal treatment device may comprise any one of at least one hot air blower or at least one heater.

The step of thermally treating the dried gel sheet comprises first thermal treatment through hot air supplied by at least one hot air blower; and second thermal treatment through at least one heater.

The section in which the first thermal treatment step is carried out is referred to as a first thermal treatment section, and the section in which the second thermal treatment step is carried out is referred to as a second thermal treatment section.

The first thermal treatment step and the second thermal treatment step may be sequentially carried out. The second thermal treatment step may be carried out after the first thermal treatment step has been carried out, or the first thermal treatment step may be carried out after the second thermal treatment step has been carried out, but it is not limited thereto. Specifically, the second thermal treatment step may be carried out after the first thermal treatment step has been carried out.

The thermal treatment of the gel sheet may be carried out through a support that continuously moves in the thermal treatment device. Specifically, the gel sheet may be positioned on the support, and the film may move in the longitudinal direction as the support moves in the moving direction.

The step of thermally treating the gel sheet comprises fixing both ends of the gel sheet (film) in the transverse direction with a fixing part; and changing the width of the gel sheet using the fixing part. The step of thermally treating the gel sheet may be carried out by fixing both ends of the gel sheet in the transverse direction with a fixing part, and thermally treating it while the width of the fixed gel sheet is changed. For example, both ends of the film in the transverse direction are fixed with pins in the thermal treatment device, and the width of the gel sheet may be changed as the position of the pins is adjusted while the film is moved by the support.

The step of fixing both ends of the gel sheet in the transverse direction with a fixing part and thermally treating it while the width of the fixed gel sheet is changed may be carried out while the gel sheet passes through the first thermal treatment section and the second thermal treatment section.

In an embodiment, in the step of changing the width of the gel sheet while the gel sheet passes through the first thermal treatment section in the longitudinal direction (in the moving direction) of the gel sheet, the width of the gel sheet may be narrowed.

In addition, in the step of changing the width of the gel sheet while the gel sheet passes through the second thermal treatment section in the longitudinal direction (in the moving direction) of the gel sheet, the width of the gel sheet may be narrowed. Alternatively, in the step of changing the width of the gel sheet, widening and narrowing the width of the gel sheet may be repeated.

The width of the gel sheet at the inlet of the first thermal treatment section may be greater than the width of the gel sheet at the outlet of the first thermal treatment section, and the width of the gel sheet at the inlet of the second thermal treatment section may be greater than the width of the gel sheet at the outlet of the second thermal treatment section.

In addition, the width of the gel sheet at the inlet of the first thermal treatment section may be greater than the width of the gel sheet at the outlet of the second thermal treatment section, but it is not limited thereto.

The maximum width of the gel sheet in the first thermal treatment section is referred to as Wa, the minimum width of the gel sheet in the first thermal treatment section is referred to as Wb, and the minimum width of the gel sheet in the first thermal treatment section and the second thermal treatment section is referred to as Wc.

For example, the width of the gel sheet at the inlet of the first thermal treatment section may be the maximum width of the gel sheet in the first thermal treatment section (Wa), and the width of the gel sheet at the outlet of the first thermal treatment section may be the minimum width of the gel sheet in the first thermal treatment section (Wb).

In addition, the width of the gel sheet at the inlet of the first thermal treatment section may be greater than the width of the gel sheet at the outlet of the first thermal treatment section, and the width of the gel sheet at the outlet of the second thermal treatment section may be the minimum width of the gel sheet in the first thermal treatment section and the second thermal treatment section (We).

As another example, Wb may be greater than or equal to We, and Wb may be less than or equal to We. Specifically, Wb may be greater than Wc. More specifically, Wa>Wb>Wc, but it is not limited thereto.

In an embodiment, the Wb/Wa value is 0.955 to 0.990. For example, the Wb/Wa value may be 0.955 or more, 0.960 or more, 0.965 or more, 0.968 or more, or 0.969 or more, and may be 0.990 or less, 0.985 or less, 0.980 or less, or 0.975 or less, but it is not limited thereto. As another example, it may be 0.955 to 0.980.

In addition, the We/Wa value is 0.950 to 0.990. For example, the Wc/Wa value may be 0.950 or more, 0.953 or more, 0.955 or more, or 0.957 or more, and may be 0.990 or less, 0.985 or less, 0.980 or less, 0.975 or less, 0.970 or less, or 0.965 or less, but it is not limited thereto. As another example, it may be 0.950 to 0.970.

As the Wb/Wa value and the We/Wa value satisfy the above ranges in the step of thermally treating the gel sheet, it is easy to control the $RSR_A$ value of the prepared polyamide-based film to 3.4 to 5.0.

In an embodiment, if the thermal treatment with hot air supplied by the at least one hot air blower is carried out, heat may be uniformly supplied. If heat is not uniformly supplied, a satisfactory surface roughness cannot be achieved, or the surface quality may not be uniform, and the surface energy may be raised or lowered too much.

The thermal treatment with hot air may be carried out in a temperature range of 100° C. to 250° C. for 5 minutes to 100 minutes. Specifically, the thermal treatment of the gel sheet with hot air may be carried out in a temperature range of 100° C. to 250° C. at a temperature elevation rate of 1.5° C./minute to 20° C./minute for 5 minutes to 60 minutes. More specifically, the thermal treatment of the gel sheet may be carried out in a temperature range of 140° C. to 250° C.

In such an event, the initial temperature of the thermal treatment of the gel sheet with hot air may be 100° C. or higher. Specifically, the initial temperature of the thermal treatment of the gel sheet with hot air may be 100° C. to 180° C. In addition, the maximum temperature in the thermal treatment with hot air may be 150° C. to 250° C.

The temperature described in the thermal treatment with hot air is the temperature in the thermal treatment device in which the gel sheet is present. It corresponds to a temperature measured by a temperature sensor located in the first thermal treatment section of the thermal treatment device.

In an embodiment, the step of thermally treating the gel sheet may comprise second thermal treatment through at least one heater, specifically, thermal treatment through a plurality of heaters.

The plurality of heaters may comprise a plurality of heaters spaced apart from each other in the transverse direction (TD direction) of the gel sheet. The plurality of heaters may be mounted on a heater mounting part, and two or more heater mounting parts may be disposed along the moving direction (MD direction) of the gel sheet.

The at least one heater may comprise an IR heater. However, the type of the at least one heater is not limited to the above example and may be variously changed. Specifically, the plurality of heaters may each comprise an IR heater.

The thermal treatment by the at least one heater may be carried out in a temperature range of 250° C. or higher. Specifically, the thermal treatment by the at least one heater may be carried out for 1 minute to 30 minutes or 1 minute to 20 minutes in a temperature range of 250° C. to 400° C.

The temperature described in the thermal treatment by a heater is the temperature in the thermal treatment device in which the gel sheet is present. It corresponds to a temperature measured by a temperature sensor located in the second thermal treatment section in the thermal treatment device.

Subsequently, after the step of thermal treatment of the gel sheet, a step of cooling the cured film may be carried out while it is moved.

The step of cooling the cured film while it is moved may comprise a first temperature lowering step of lowering the temperature at a rate of 100° C./minute to 1,000° C./minute and a second temperature lowering step of lowering the temperature at a rate of 40° C./minute to 400° C./minute.

In such an event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step is faster than the maximum rate of the second temperature lowering step. Alternatively, the minimum rate of the first temperature lowering step is faster than the minimum rate of the second temperature lowering step.

If the step of cooling the cured film is carried out in such a multistage manner, it is possible to have the physical properties of the cured film further stabilized and to maintain the optical properties and mechanical properties of the film achieved during the curing step more stably for a long period of time.

In addition, a step of winding the cooled cured film using a winder may be carried out.

In such an event, the ratio of the moving speed of the gel sheet on the belt at the time of drying to the moving speed of the cured film at the time of winding is 1:0.95 to 1:1.40. Specifically, the ratio of the moving speeds may be 1:0.99 to 1:1.20, 1:0.99 to 1:1.10, or 1:1.01 to 1:1.10, but it is not limited thereto.

If the ratio of the moving speeds is outside the above range, the mechanical properties of the cured film may be impaired, and the flexibility and elastic properties may be deteriorated.

In the process for preparing a polyamide-based film, the thickness variation (%) according to the following Relationship 1 may be 3% to 30%. Specifically, the thickness variation (%) may be 5% to 20%, but it is not limited thereto.

$$\text{Thickness variation } (\%)=(M1-M2)/M2 \times 100 \qquad \text{[Relationship 1]}$$

In Relationship 1, M1 is the thickness (μm) of the gel sheet, and M2 is the thickness (μm) of the cooled cured film at the time of winding.

The polyamide-based film is prepared by the preparation process as described above such that it is excellent in mechanical properties, as well as it is excellent in restoring force when it is bent for a long period of time and the bending force is then released, and wrinkles are not visible after a severe folding test. In addition, as it achieves the desired level of loop stiffness not only at room temperature but also in extremely low-temperature environments, it can be applied to various uses that require flexibility and mechanical durability. For example, the polyamide-based film may be applied to not only display devices but also solar cells, semiconductor devices, sensors, and the like.

Details on the polyamide-based film prepared by the process for preparing a polyamide-based film are as described above.

Embodiments for Carrying Out the Invention

Hereinafter, the above description will be described in detail by referring to examples. However, these examples are set forth to illustrate the present invention, and the scope of the present invention is not limited thereto.

Example 1

A temperature-controllable reactor was charged with dimethylacetamide (DMAc) as an organic solvent at 10° C. under a nitrogen atmosphere. Then, 2,2'-bis(trifluoromethyl)-4,4'-diaminobiphenyl (TFMB) as an aromatic diamine was slowly added thereto and dissolved.

Then, as a dicarbonyl compound, terephthaloyl chloride (TPC) was added, followed by stirring for 1 hour. And isophthaloyl chloride (IPC) was added in an amount of 94% by mole of the total amount introduced, followed by stirring for 1 hour, thereby preparing a first polymer solution.

The viscosity of the first polymer solution thus prepared was measured. If the measured viscosity did not reach the target viscosity, an IPC solution in a DMAc organic solvent at a concentration of 10% by weight was prepared and added to the first polymer solution, followed by stirring for 30 minutes. This procedure was repeated until the viscosity became 250,000 cps, thereby preparing a second polymer solution.

The polymer solution thus obtained was coated onto a substrate and then dried in a temperature range of 90° C. to 120° C. with hot air for about 30 minutes to prepare a gel sheet.

Thereafter, as a thermal treatment step of the dried gel sheet, a first thermal treatment step and a second thermal treatment step were sequentially carried out in a thermal treatment device. Specifically, the gel sheet was treated with hot air at a temperature of 140° C. to 250° C. as the first thermal treatment step (in the first thermal treatment section). In such an event, the temperature in the first thermal treatment section is the temperature in the thermal treatment device in which the gel sheet is present. It corresponds to a temperature measured by a temperature sensor located in the first thermal treatment section of the thermal treatment device.

Subsequently, the gel sheet was thermally treated by a plurality of IR heaters (IR heaters with a maximum temperature of 1,200° C.) at a temperature of 250° C. to 400° C. as the second thermal treatment step (in the second thermal treatment section). In such an event, the temperature in the second thermal treatment section is the temperature in the thermal treatment device in which the gel sheet is present. It corresponds to a temperature measured by a temperature sensor located in the second thermal treatment section of the thermal treatment device.

In such an event, in the step of thermally treating the gel sheet, both ends of the gel sheet in the transverse direction were fixed with a fixing part, and it was thermally treated while the width of the fixed gel sheet was changed. Specifically, when the maximum width of the gel sheet in the first thermal treatment section is referred to as Wa, the minimum width of the gel sheet is in the first thermal treatment section is referred to as Wb, and the minimum width of the gel sheet in the first thermal treatment section and the second thermal treatment section is referred to as Wc, both ends of the gel sheet in the transverse direction were fixed with a fixing part such that Wa (which is the same as the width of the gel sheet at the inlet of the first thermal treatment section) was 1,660 mm, and thermal treatment was carried out such that Wb/Wa was 0.969 and We/Wa was 0.957 while the width of the gel sheet was changed, when the gel sheet was moved in the longitudinal direction.

Thereafter, a first temperature lowering step was carried out by lowering the temperature at a rate of about 800° C./minute, followed by a second temperature lowering step by lowering the temperature at a rate of about 100° C./minute, thereby obtaining a polyamide-based film having a thickness of 50 μm, which was wound using a winder. In such an event, the conveying speed of the gel-sheet on the belt at the time of drying was 1 m/s. The speed of the winder was controlled such that the ratio of the moving speed of the gel-sheet on the belt at the time of drying to the moving speed of the film at the time of winding was within the range of 1:1.01 to 1:1.10.

The specific composition and molar ratio of the polyamide-based polymer are shown in Table 1 below.

Examples 2 to 5 and Comparative Examples 1 and 2

Films were each prepared in the same manner as in Example 1, except that the composition and molar ratio of the polymer, Wb/Wa and Wc/Wa of the gel sheet in the thermal treatment step, and the like were changed as shown in Table 1 below.

In addition, in the case where a dianhydride compound was reacted during the preparation of a polymer solution, the dianhydride compound was slowly added and stirred after the aromatic diamine had been dissolved in an organic solvent and before the dicarbonyl compound was added.

Evaluation Example

The films prepared in the Examples and Comparative Examples were each measured and evaluated for the following properties. The results are shown in Table 1 below.

Evaluation Example 1: Measurement of Film Thickness

The thickness was measured at 5 random points using a digital micrometer 547-401 manufactured by Mitutoyo Corporation. Their average value was adopted as the thickness.

Evaluation Example 2: Measurement of Modulus

A sample was cut out by at least 10 cm in the direction perpendicular to the main shrinkage direction of the film and by 10 cm in the main shrinkage direction. It was fixed by the clips disposed at an interval of 10 cm in a universal testing machine UTM 5566A of Instron. A stress-strain curve was obtained until the sample was fractured while it was stretched at a speed of 12.5 mm/minute at room temperature. The slope of the load with respect to the initial strain on the stress-strain curve was taken as the modulus (GPa).

Evaluation Example 3: Measurement of Transmittance and Haze

The light transmittance and haze were measured using a haze meter NDH-5000W manufactured by Nippon Denshoku Kogyo in accordance with the JIS K 7136 standard.

Evaluation Example 4: Measurement of Yellow Index

The yellow index (YI) was measured with a spectrophotometer (UltraScan PRO, Hunter Associates Laboratory) under the conditions of d65 and 100 in accordance with the ASTM-E313 standard.

Evaluation Example 5: Measurement of Loop Stiffness

Both ends of a polyamide-based film having a width of 15 mm, a length of 120 mm, and a thickness of 50 μm were fixed to the fixing part of a loop stiffness tester (Toyoseiki). The polyamide-based film was pressed using the pressing part at a pressing speed of 3.3 mm/s until the final separation distance (L) between the pressing part and the fixing part was 20 mm. Then, the loop stiffness of the polyamide-based film was measured with the sensor.

$RSR_{MD}$ is the loop stiffness value measured with the MD direction of the film as the longitudinal direction at room temperature, $RSR_{TD}$ is the loop stiffness value measured with the TD direction of the film as the longitudinal direction at room temperature, $RSL_{MD}$ is the loop stiffness value measured with the MD direction of the film as the longitudinal direction within 1 minute after the film is left at a low temperature of −20° C. for 2 hours, and $RSL_{TD}$ is the loop stiffness value measured with the TD direction of the film as the longitudinal direction within 1 minute after the film is left at a low temperature of −20° C. for 2 hours.

Evaluation Example 6: Evaluation of Deformation Angle (Static Flexural Test)

Each polymer film having a width of 20 mm, a length of 150 mm, and a thickness of 50 μm was folded to have a radius of curvature of 2 mm in a glass zig, which was then left at 25° C. for 24 hours, and the force applied to the film was released. Then, the inner angle (AG of FIG. 6(b)) of the film was measured (see FIG. 6).

Evaluation Example 7: Evaluation of Wrinkle Visibility

Each film having a thickness of 50 μm was subjected to repeated folding to have a radius of curvature of 2 mm and then unfolded (the number of folding counts one upon folding and unfolding) 200,000 times. Upon folding 200,000 times, if wrinkles were hardly visible, it was evaluated as ○; if wrinkles were slightly visible, it was evaluated as A; and if wrinkles were vividly visible, it was evaluated as x.

resistance. That is, the films of Comparative Examples 1 and 2 are vulnerable to external pressing. In particular, they are significantly deformed when they have been folded for a long period of time. Thus, when applied to a display device, they do not show a uniform screen state, or winkles are visible, resulting in a problem in that the screen is distorted.

In the polyamide-based films of Examples 1 to 5, as to the loop stiffness, they were excellent in loop stiffness when they were left for 2 hours at an extremely low temperature of −20° C. as well as at room temperature. They also showed improved results as compared with the films of the Comparative Examples in the evaluation of static flexural resistance and wrinkle visibility after folding. Thus, they can be advantageously applied to a foldable display, a flexible display, a rollable display, and the like.

| Explanation of Reference Numerals | |
| --- | --- |
| 100: polyamide-based film | |
| 101: first side | 102: second side |
| 200: functional layer | 300: cover window |
| 400: display unit | 500: adhesive layer |
| 10: fixing part | |
| 20: pressing part | |
| L: final separation distance (L) when loop stiffness is measured | |
| AG: inner angle of a film when deformation angle is evaluated | |

TABLE 1

| | | Ex. 1 | Ex. 2 | Ex. 3 | Ex. 4 | Ex. 5 | C. Ex. 1 | C. Ex. 2 |
| --- | --- | --- | --- | --- | --- | --- | --- | --- |
| Diamine | | TFMB | TFMB | TFMB | TFMB | TFMB | TFMB | TFMB |
| (Molar ratio) | | 100 | 100 | 100 | 100 | 100 | 100 | 100 |
| Dianhydride | | 6FDA 7 | 6FDA 11 | — | — | 6FDA 7 | — | — |
| (Molar ratio) | | | BPDA 34 | | | | | |
| Dicarbonyl compound | | TPC 71 | TPC 55 | TPC 70 | TPC 60 | TPC 71 | TPC 70 | TPC 60 |
| (Molar ratio) | | IPC 22 | | IPC 30 | IPC 40 | IPC 22 | IPC 30 | IPC 40 |
| Thickness (μm) | | 50 | 50 | 50 | 50 | 50 | 50 | 50 |
| Modulus (GPa) | | 6.5 | 6.3 | 6.9 | 6.4 | 5.9 | 5.6 | 5.3 |
| TT (%) | | 89.7 | 88.9 | 88.9 | 89.3 | 89.7 | 85.9 | 88.4 |
| Hz (%) | | 0.2 | 0.5 | 0.4 | 0.2 | 0.2 | 21.9 | 0.9 |
| YI | | 2.2 | 3.5 | 2.7 | 2.4 | 2.2 | 8.35 | 3.6 |
| (Room temp.) | $RSR_{MD}$ | 3.83 | 3.73 | 3.93 | 3.87 | 3.59 | 3.31 | 3.23 |
| Loop stiffness | $RSR_{TD}$ | 3.80 | 4.08 | 4.08 | 3.76 | 3.58 | 3.29 | 3.28 |
| (m/N) | | | | | | | | |
| (Low temp.) | $RSL_{MD}$ | 3.97 | 3.87 | 4.10 | 3.91 | 3.70 | 3.38 | 3.33 |
| Loop stiffness | $RSL_{TD}$ | 3.94 | 4.16 | 4.15 | 3.89 | 3.67 | 3.35 | 3.37 |
| (m/N) | | | | | | | | |
| $RSR_A$ value (m/N) | | 3.815 | 3.905 | 4.005 | 3.815 | 3.585 | 3.3 | 3.255 |
| $RSL_A$ value (m/N) | | 3.955 | 4.015 | 4.125 | 3.9 | 3.685 | 3.365 | 3.35 |
| Deformation angle | | 160 | 160 | 165 | 160 | 155 | 135 | 130 |
| (24 hrs, 2 mm) | | | | | | | | |
| Wrinkle visibility | | ○ | ○ | ○ | ○ | Δ | x | x |
| Wb/Wa | | 0.969 | 0.969 | 0.969 | 0.969 | 0.969 | 0.951 | 0.951 |
| Wc/Wa | | 0.957 | 0.957 | 0.957 | 0.957 | 0.945 | 0.945 | 0.945 |

Referring to Table 1, the films according to the Examples in which the $RSR_A$ value was adjusted to 3.4 to 5.0 were excellent in film properties such as loop stiffness, modulus, transmittance, haze, and yellow index, as well as excellent in restoring force when they were bent for a long period of time and the bending force was then released, and wrinkles were hardly visible even after it had been folded 200,000 times or more.

Specifically, as to the restoring force, the films of Examples 1 to 5 had an inner angle of 150° or more after the deformation angle evaluation test, whereas the films of Comparative Examples 1 and 2 had a value of 1350 and 1300, respectively, showing poor results in the static flexural

The invention claimed is:

1. A polyamide-based film, which comprises a polyamide-based polymer and has an $RSR_A$ value of 3.6 m/N to 5.0 m/N as represented by the following Equation 1 and an $RSL_A$ value of 3.7 m/N to 5.0 m/N as represented by the following Equation 2 based on the thickness of the film of 50 μm:

$$RSR_A = (RSR_{MD} + RSR_{TD})/2 \qquad \text{<Equation 1>}$$

in Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature, wherein $RSR_{MD}$ is 3.35 m/N to 5.0 m/N, and $RSR_{TD}$ is 3.3 m/N to 5.0 m/N, $$RSL_A=(RSL_{MD}+RSL_{TD})/2 \qquad \text{<Equation 2>}$$

in Equation 2, $RSL_{MD}$ is the loop stiffness value measured with the MD direction of the film as the longitudinal direction within 1 minute after the film is left at −20° C. for 2 hours, and $RSL_{TD}$ is the loop stiffness value measured with the TD direction of the film as the longitudinal direction within 1 minute after the film is left at −20° C. for 2 hours, wherein the polyamide-based polymer comprises an imide-based repeat unit and an amide-based repeat unit at a molar ratio of 0:100 to 7:93, wherein the film is manufactured by a method comprising, polymerizing a diamine compound, a dicarbonyl compound, and, optionally, a dianhydride compound in an organic solvent to prepare a polyamide-based polymer solution;

casting the solution and then drying it to prepare a gel sheet; and thermally treating the gel sheet, wherein the step of thermally treating the gel sheet is carried out by fixing both ends of the gel sheet in the transverse direction with a fixing part, and thermally treating it while the width of the fixed gel sheet is changed, wherein the step of thermally treating the gel sheet comprises first thermal treatment through hot air supplied by at least one hot air blower; and second thermal treatment through at least one heater, and wherein when the section in which the first thermal treatment step is carried out is referred to as a first thermal treatment section, the section in which the second thermal treatment step is carried out is referred to as a second thermal treatment section, the maximum width of the gel sheet in the first thermal treatment section is referred to as Wa, the minimum width of the gel sheet is in the first thermal treatment section is referred to as Wb, the minimum width of the gel sheet in the first thermal treatment section and the second thermal treatment section is referred to as Wc, and the Wb/Wa value is 0.955 to 0.990, and the Wc/Wa value is 0.950 to 0.990.

2. The polyamide-based film of claim 1, wherein when the film based on a thickness of 50 µm is folded to have a radius of curvature of 2 mm, which is then left at 25° C. for 24 hours, and the force applied to the film is released, the inner angle of the film is 140° or more.

3. The polyamide-based film of claim 1, which has a modulus of 5 GPa or more.

4. The polyamide-based film of claim 1, which has a transmittance of 80% or more, a haze of 1% or less, and a yellow index or 5 or less.

5. The polyamide-based film of claim 1, which further comprises at least one selected from the group consisting of a filler, a blue pigment, and a UVA absorber.

6. A cover window, which comprises a polyamide-based film according to claim 1 and a functional layer, wherein the polyamide-based film comprises a polyamide-based polymer and has an $RSR_A$ value of 3.6 m/N to 5.0 m/N as represented by the following Equation 1 and an $RSL_A$ value of 3.7 m/N to 5.0 m/N as represented by the following Equation 2 based on the thickness of the film of 50 µm:

$$RSR_A=(RSR_{MD}+RSR_{TD})/2 \qquad \text{<Equation 1>}$$

in Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature, wherein $RSR_{MD}$ is 3.35 m/N to 5.0 m/N, and $RSR_{TD}$ is 3.3 m/N to 5.0 m/N, $$RSL_A=(RSL_{MD}+RSL_{TD})/2 \qquad \text{<Equation 2>}$$

in Equation 2, $RSL_{MD}$ is the loop stiffness value measured with the MD direction of the film as the longitudinal direction within 1 minute after the film is left at −20° C. for 2 hours, and $RSL_{TD}$ is the loop stiffness value measured with the TD direction of the film as the longitudinal direction within 1 minute after the film is left at −20° C. for 2 hours, wherein the polyamide-based polymer comprises an imide-based repeat unit and an amide-based repeat unit at a molar ratio of 0:100 to 7:93.

7. A display device, which comprises a display unit; and a cover window disposed on the display unit, wherein the cover window comprises a polyamide-based film according to claim 1 and a functional layer, and the polyamide-based film comprises a polyamide-based polymer and has an $RSR_A$ value of 3.6 m/N to 5.0 m/N as represented by the following Equation 1 and an $RSL_A$ value of 3.7 m/N to 5.0 m/N as represented by the following Equation 2 based on the thickness of the film of 50 µm:

$$RSR_A=(RSR_{MD}+RSR_{TD})/2 \qquad \text{<Equation 1>}$$

in Equation 1, $RSR_{MD}$ is the loop stiffness value measured with the MD direction of the film as the longitudinal direction at room temperature, and $RSR_{TD}$ is the loop stiffness value measured with the TD direction of the film as the longitudinal direction at room temperature, wherein $RSR_{MD}$ is 3.35 m/N to 5.0 m/N, and $RSR_{TD}$ is 3.3 m/N to 5.0 m/N, $$RSL_A=(RSL_{MD}+RSL_{TD})/2 \qquad \text{<Equation 2>}$$

in Equation 2, $RSL_{MD}$ is the loop stiffness value measured with the MD direction of the film as the longitudinal direction within 1 minute after the film is left at −20° C. for 2 hours, and $RSL_{TD}$ is the loop stiffness value measured with the TD direction of the film as the longitudinal direction within 1 minute after the film is left at −20° C. for 2 hours, wherein the polyamide-based polymer comprises an imide-based repeat unit and an amide-based repeat unit at a molar ratio of 0:100 to 7:93, wherein $RSR_{MD}$ is 3.35 m/N to 5.0 m/N, and $RSR_{TD}$ is 3.3 m/N to 5.0 m/N.

\* \* \* \* \*